(12) United States Patent
Lee et al.

(10) Patent No.: US 9,322,294 B2
(45) Date of Patent: Apr. 26, 2016

(54) OIL-FREE TURBOCHARGER ASSEMBLY

(75) Inventors: Yong Bok Lee, Seoul (KR); Chang Ho Kim, Seoul (KR); Dong Jin Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1199 days.

(21) Appl. No.: 12/988,849

(22) PCT Filed: May 19, 2008

(86) PCT No.: PCT/KR2008/002793
§ 371 (c)(1),
(2), (4) Date: Oct. 21, 2010

(87) PCT Pub. No.: WO2009/131269
PCT Pub. Date: Oct. 29, 2009

(65) Prior Publication Data
US 2011/0038717 A1 Feb. 17, 2011

(30) Foreign Application Priority Data

Apr. 21, 2008 (KR) ........................ 10-2008-0036668

(51) Int. Cl.
*F02C 6/12* (2006.01)
*F01D 25/22* (2006.01)
*F02B 39/14* (2006.01)

(52) U.S. Cl.
CPC . *F01D 25/22* (2013.01); *F02C 6/12* (2013.01); *F02B 39/14* (2013.01); *F05D 2220/40* (2013.01); *F05D 2240/52* (2013.01)

(58) Field of Classification Search
CPC ........... F01D 25/16; F02B 37/00; F02D 7/00; F05D 2240/52; F05D 2240/54; F16C 17/24; F16C 2360/24; F02C 6/12
USPC ........... 415/104, 105, 107, 109, 170.1, 171.1, 415/174.2, 174.3; 29/889, 889.2
See application file for complete search history.

(56) References Cited

U.S. PATENT DOCUMENTS 3,375,046 A * 3/1968 Marley .......................... 384/105
4,167,295 A * 9/1979 Glaser ........................... 384/105
(Continued)

FOREIGN PATENT DOCUMENTS

JP        05-248428        9/1993
JP        09-217630        8/1997
(Continued)

OTHER PUBLICATIONS

Korean Intellectual Property Office, PCT International Search Report, international application No. PCT/KR2008/002793, Jan. 21, 2009.
Korean Intellectual Property Office, Notice of Allowance, Dec. 31, 2009.
(Continued)

*Primary Examiner* — Sean J Younger
(74) *Attorney, Agent, or Firm* — NSIP Law

(57) ABSTRACT

The present invention relates to an oil-free turbocharger assembly using an airfoil bearing that may be useful in high speed conditions. The assembly can be cooled easily. A heat-proof coating can also be easily applied to the turbo charger's rotating shaft. In one embodiment, an oil-free turbocharger assembly has a constant distance between a journal portion and a rotating shaft so that the mass of the rotating body can be minimized and the rotating body assembly can have a small moment of inertia. The turbocharger in some embodiments of the invention may be cooled by a refrigerant which improves cooling efficiency. Each part of the rotating body assembly in some embodiments may be individually treated with a heat-proof process so that productivity can be improved.

13 Claims, 5 Drawing Sheets

(56) References Cited

U.S. PATENT DOCUMENTS

| | | | | |
|---|---|---|---|---|
| 4,655,043 | A | * | 4/1987 | McInerney ................ 60/602 |
| 5,911,510 | A | * | 6/1999 | Saville ..................... 384/103 |
| 6,085,527 | A | * | 7/2000 | Woollenweber et al. ....... 60/607 |
| 6,449,950 | B1 | | 9/2002 | Allen |
| 6,848,828 | B2 | * | 2/2005 | Nishijima et al. ............ 384/106 |
| 6,964,522 | B2 | * | 11/2005 | Kang et al. .................. 384/103 |
| 7,108,488 | B2 | | 9/2006 | Larue |
| 7,988,426 | B2 | * | 8/2011 | Elpern et al. ................ 417/53 |
| 8,181,632 | B2 | * | 5/2012 | Ueno et al. ................. 123/559.1 |
| 2005/0210875 | A1 | | 9/2005 | Larue et al. |
| 2008/0080966 | A1 | * | 4/2008 | Ueno et al. ................. 415/112 |

FOREIGN PATENT DOCUMENTS

| | | |
|---|---|---|
| JP | 02749691 B2 | 2/1998 |
| JP | 11-062970 | 3/1999 |
| JP | 2001-221185 | 8/2001 |
| KR | 20040009042 | 1/2004 |
| WO | WO 2007116754 A1 * | 10/2007 |

OTHER PUBLICATIONS

Chinese Office Action issued Aug. 1, 2012 in counterpart Chinese Application No. 200880129951.1 (13 pages, including English language translation).

* cited by examiner

OIL-FREE TURBOCHARGER ASSEMBLY

Cross-Reference to Related Applications

This application is a National Stage of International Application No. PCT/KR2008/002793, filed May 19, 2008 and published as WO2009/131269 on July 21, 2011, which claims the benefit of KR Patent Application No. 10-2008-0036668, filed on Apr. 21, 2008, the entire disclosures of which are incorporated herein by reference for all purposes.

TECHNICAL FIELD

The present invention relates to a turbocharger assembly, and more particularly to an oil-free turbocharger assembly, which uses an airfoil bearing. In high speed conditions the airfoil bearing can be cooled easily while heat-proof coating can be easily applied to its rotating shaft.

BACKGROUND ART

Generally, a turbocharger is configured to increase efficiency of an engine or a gas turbine of a vehicle. One of the most important factors in designing a turbocharger with excellent reliability and high efficiency is in the selection of a suitable bearing while considering driving conditions. The bearing is a vital mechanical component which significantly influences the efficiency and dynamic stability of the turbocharger. Thus, some problems relating to turbocharger systems are directly or indirectly related to the types of bearings used.

Turbochargers are commonly developed for diesel vehicles since diesel vehicles are more common.

Hereinafter, A prior art turbochager will be described with a reference to FIG. 1.

FIG. 1 is a cross sectional view showing a prior art turbocharger. A rotating body of a conventional turbocharger is supported by a ball bearing. However, if the ball bearing supports the rotating shaft of the turbocharger at high speeds and high temperature conditions, this may result in heavy friction loses causing structural thermal deformation or fractures. Thus, the prior art turbocharger illustrated in FIG. 1 proposes the use of an airfoil bearing. A rotating shaft (20) is built in a housing (10) while a turbine (1) and an impeller (2) is attached to both ends of the rotating shaft (20) respectively. A sealing member (30) is located between the shaft and the impeller (2) which prevents leakage from the shaft in an axial direction. An airfoil journal bearing (40) is located between the rotating shaft (20) and the housing (10) in order to produce dynamic-pressure which causes rotating shaft (20) to float. A thrust pad (50) is located in the middle portion of the rotating shaft (20) in order to axially support the rotating shaft (20). An airfoil thrust bearing (80) is mounted to the housing (10) on both sides of the thrust pad (50). An air-cooled cooler (60) is provided to the housing (10) in order to cool the rotating shaft (20), the airfoil journal bearing (40) and the thrust pad (50).

The rotating shaft (20), thrust pad (50) and the sealing member (30) are integrated into one body through a grinding process. In order to obtain sufficient dynamic pressure, the gap between the rotating shaft (20) and the airfoil journal bearing (40) should be minimized. Thus, the rotating shaft (20) should be sufficiently thick throughout the entire corresponding housing (10).

In order to improve thermal endurance, integrated rotating body (20), thrust pad (50) and sealing member (30) go through a solid-lubricant coating process, an abrasion process and a surface polishing process. The solid lubricant process produces less friction.

Heat-proof processing becomes a more important factor when the turbocharger operates in an environment with higher temperature and higher speed. However, if components of the turbocharger such as the rotating shaft (20), the thrust pad (5), the sealing member, etc. are integrated into a single body as in the prior art turbocharger, it is difficult to coat each of the components with the solid-lubricant uniformly. The corner portions become especially difficult to coat. Furthermore, components may become fractured during the abrasion process and/or the polishing process. Thus, the success rate of the heat-proof process (solid-lubricant coating, abrasion, polishing) is no more than about 20%.

Also, as mentioned above, the thickness of a journal portion (21) of the rotating shaft (20) should be heavy enough so that the airfoil journal bearing (40) can form sufficient dynamic pressure. Thus, material may be wasted. In addition, the inclusion of a heavy journal portion may also cause a very large moment of inertia causing a detrimental turbo-lag condition during rapid acceleration.

Moreover, there is another problem in that it is difficult to maintain cooling efficiency with the air-cooled cooling method in extreme environments.

DISCLOSURE OF INVENTION

Technical Problem

Some embodiments of the present invention solve the above problems. According to some embodiments of the present invention, individual parts which rotate with a rotating shaft are manufactured individually and later assembled. Thus, it is an object of some embodiments of the present invention to provide an oil-free turbocharger assembly having improved manufacturing success rates and allowing for each part to be individually coated, grinded and polished.

It is also another objective of some embodiments of the present invention to provide an oil-free turbocharger assembly having an individual journal portion. This journal portion may be coupled to the rotating shaft separately so that the rotating shaft is thick enough to allow a sufficient turbo-lag condition. Manufacturing cost can be reduced by reducing mass and having a lower moment of inertia.

Further, it is another objective of some embodiments of the present invention to provide an oil-free turbocharger assembly which can improve cooling efficiency of the turbocharger using oil cooling.

Technical Solution

Some embodiments of the present invention achieve some of the above objectives in various ways. In one embodiment of the invention an oil-free turbocharger assembly is provided which includes a housing having an inner surface; a rotational body assembly including a rotating shaft positioned inside the housing, an impeller coupled to one end of the rotating shaft, a turbine coupled to the other end of the rotating shaft, a journal portion coupled to the rotating shaft, and a thrust pad coupled to the rotating shaft. A journal bearing is located on the inner surface of the housing and is configured to support the journal portion during rotational driving thereof. A thrust bearing is configured to axially support the thrust pad, wherein the journal portion has a cylindrical portion disposed in spaced-relation from the rotating shaft with a constant distance therebetween. The thrust pad is formed as a circular disk coaxially disposed with respect to the rotating shaft.

The rotating shaft, the journal portion, and the thrust pad of the rotational body assembly can be each treated with a heat-proof process prior to assembly. In some embodiments the rotating shaft, the journal portion, and the thrust pad are treated with a solid-lubricant coating process, an abrasion process, and a polishing process respectively.

In other embodiments, the thrust pad defines a coupling hole thereat, and a journal portion coupling projection is formed at an impeller side end portion of the journal portion while the journal portion coupling projection is shrink-fitted and spot-welded into the coupling hole toward the impeller. The turbocharger assembly can further include a fastening member having a fastening projection being shrink-fitted and spot-welded into the coupling hole of the thrust pad toward the turbine.

In some embodiments, the journal bearing is an airfoil bearing configured to form dynamic pressure so as to support the rotational body assembly during rotation of the journal portion of the rotating shaft and the thrust bearing is an airfoil bearing configured to form dynamic pressure so as to axially support the rotational body assembly during rotation of the thrust pad. The thrust bearing can be an airfoil bearing having a top foil and a bump foil cut in a radial direction at regular intervals.

The turbocharger assembly in some embodiments can further include a cooler configured to cool the outer surface of the housing corresponding to the journal portion with refrigerant. A plurality of cooling fins can be disposed circumferentially around the housing in other embodiments.

The cooler can be connected to an intercooler. Thus, the refrigerant circulates therethrough so as to cool the housing, the refrigerant being cooled within the intercooler so as to be reintroduced into the cooler.

The refrigerant can be a cooling engine-oil substance or a cooling water substance.

Advantageous Effects

In accordance with one embodiment, the rotating parts connected to the rotating shaft of the oil-free turbocharger assembly may be manufactured as individual parts to be separately assembled. Further, in the manufacturing process of the parts, each of the individual parts may be treated with a solid-lubricant coating process, an abrasion process and a polishing process such as heat-proof processes. In some embodiments, deformation or fracturing of individual parts or the assembly as a whole may be prevented during the heat-proof process of the journal portion.

In accordance with another embodiment, the mass of the journal portion may be minimized or kept small since the journal portion may be manufactured as an individual part from the shaft. Thus, in some embodiments one advantage is that the moment of inertial of the rotating parts can be diminished thereby reducing the turbo lag condition.

Further there are other advantages that may include the improvement of cooling efficiency since the thrust pad is positioned near the impeller. This allows the whole housing to be cooled by the refrigerant.

BEST MODE FOR CARRYING OUT THE INVENTION

Hereinafter, referring to FIGS. 2 to 7, an embodiment of an oil-free turbocharger assembly according to embodiments of the present invention will be described in detail.

Figure 1:
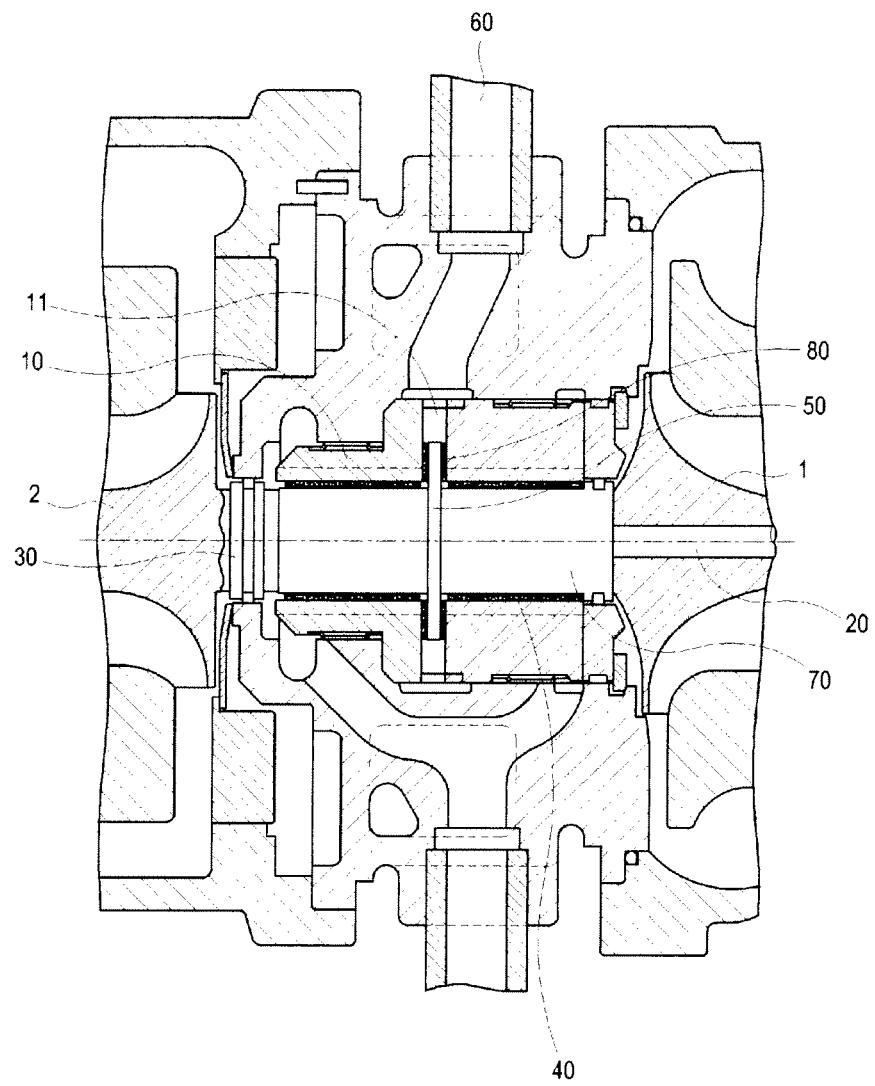
FIG. 1 is a cross sectional view showing a prior art turbocharger.
Figure 2:
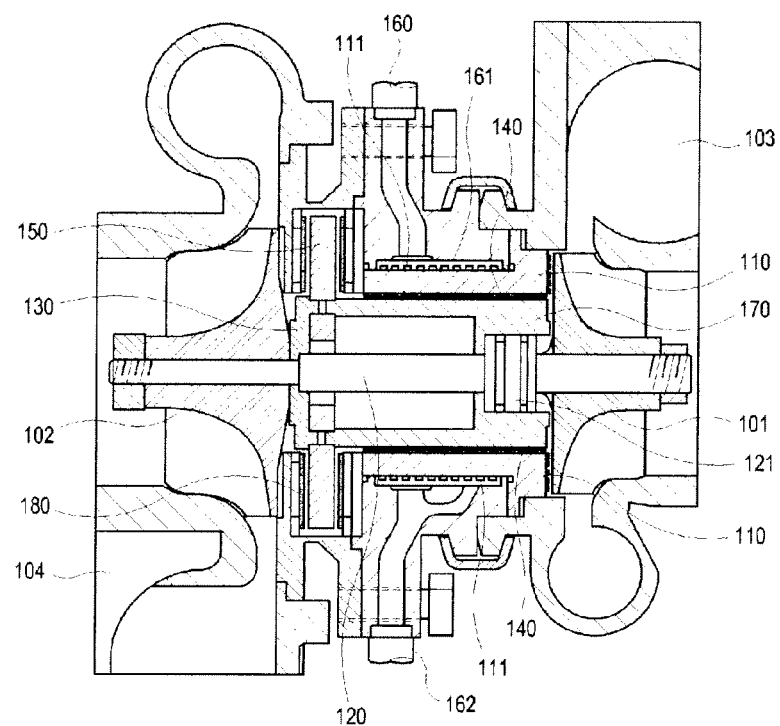
FIG. 2 is a cross sectional view showing an embodiment of an oil-free turbocharger according to the present invention.
Figure 3:
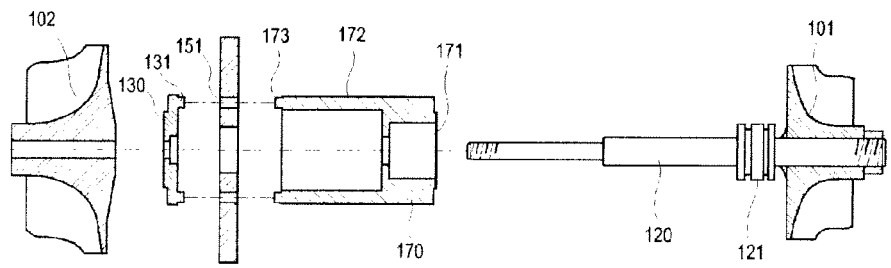
FIG. 3 is an exploded view showing cross sections of a rotating body assembly of the oil-free turbocharger assembly according to the present invention.
Figure 4:
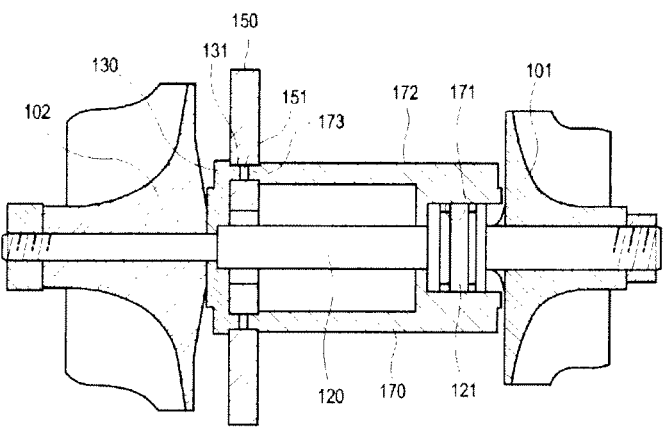
FIG. 4 is a cross sectional view showing an assembled condition of the rotating body assembly in FIG. 3.

FIG. 2 is a cross sectional view showing an embodiment of an oil-free turbocharger and, FIG. 3 is an exploded view showing cross sections of a rotating body assembly of the oil-free turbocharger assembly according to the present invention, and FIG. 4 is a cross sectional view showing an assembled condition of the rotating body assembly of FIG. 3.

As shown in FIGS. 2 to 4, a turbo charger assembly in this embodiment includes a housing (110); a rotating shaft (120) positioned inside the housing (110), a turbine (101) and an impeller (102) coupled to both ends of the rotating shaft (120); and a journal portion (170) coupled to the periphery of the rotating shaft (120). The journal portion has an outer surface near the inner surface of the housing (110) and the inner portion is in some embodiments hollow. The turbo charger assembly further includes an airfoil journal bearing (140) located on the inner surface of the housing (110) to support the journal portion (170) with dynamic pressure when the journal portion (170) rotates. A thrust pad (150) is coupled to the impeller side rotating shaft in a radial direction. Airfoil thrust bearings (180) are disposed at the front end and rear end of the thrust pad (150) forming dynamic pressure during rotation of thrust pad (150) so that the thrust pad (150) can be supported axially. A coupling member (130) is positioned in some embodiments to act as a cover which may provide a strong coupling between the journal portion (170) and the thrust pad (150). Cooler (160) may use refrigerants or other known substances or materials well known to those of ordinary skill in the art to cool the outer surface of the housing (110). Cooling fins (111) may be provided in some embodiments on the outer surface of the housing (110) to improve cooling efficiency.

The rotating body assembly of the turbocharger is constructed by the turbine (101), the rotating body (120), the journal portion (170), the thrust pad (150), the coupling member (130) and the impeller (102). When these components are assembled, they rotate together.

The manner in which these components are assembled to provide a rotating body assembly are described in more detail below.

The impeller (102) is coupled to the front side of the rotating shaft (120). The rotating shaft (120) has a fastening portion (121) to be fastened to the journal portion (170). In some embodiments, a fastening recess (171) is located on a rear portion of journal portion (170) for connection to fastening portion (121). The journal portion (170) has a cylindrical portion (172) in front of the fastening recess (171). Thus, if the rotating shaft (120) and the journal portion (170) have been fastened, a space between the rotating shaft (120) and the cylindrical portion (172) may be maintained. In some embodiments this will allow the mass of the rotating body assembly to be minimized allowing for some empty space between the rotating shaft (120) and the cylindrical portion (172). As the mass of journal portion (170) is minimized or becomes smaller, the moment of inertia may also decrease.

The thrust pad (150) and the coupling member (130) are sequentially coupled to the front end of the journal portion (170). The thrust pad (150) has coupling holes (151). The journal portion (170) has coupling projections (173) in the front end while the coupling member (130) has coupling projections (131) in the rear end. The coupling projections (173) are inserted into the corresponding coupling holes (151) respectively from the rear end (frontwards) while the coupling projections (131) are inserted into the corresponding coupling holes (151) respectively from the front end (rearwards). The impeller (102) is coupled to the rotating shaft on the front of the coupling member (130). The turbine (101) is coupled on the rear end of the rotating shaft (120). The turbine (101) and the impeller (102) are screwed at both ends of the rotating shaft (120) and are tightened by nuts.

According to another embodiment, journal portion (170) is not integrated to the rotating shaft (120) and instead forms a cylindrical shape. In this embodiment, the rotating body assembly the mass and moment of inertia are relatively small. Thus, the turbo-lag condition may be considerably reduced improving the performance of the turbocharger.

Further, if the parts of the rotating body assembly are individually manufactured before assembly, each part in some embodiments, can be treated separately with solid-lubricant coating, abrasion and polishing processes during the manufacturing process. The parts can then be shrink-fitted and spot-welded to each other so that they can be coupled strongly to one another. Thus, each component of the rotating body assembly can be easily treated with a heat-proof process and be assembled into an integrated rotating body. In other words, a solid lubricant can be uniformly coated since all components are assembled into an integrated body after completion of the heat-proof processes. Further, fracture or deformation can be prevented where shape-gradient may change extremely. Thus, productivity can be improved. More specifically, if the rotating shaft, the journal portion, the thrust pad, etc. are integrated into a single body through a grinding process, the heat-proof process including solid lubricant coating, abrasion and polishing, etc. may easily have a success rate which is lower than 20%. However, some embodiments of the present invention may have a much higher success rate. The overall failure rate in some embodiments of the invention is very low since each part has a simple shape which can be easily treated with a heat-proof process.

Furthermore in some embodiments, the amount of materials used can be reduced since the mass of the journal portion is reduced.

Figure 5:
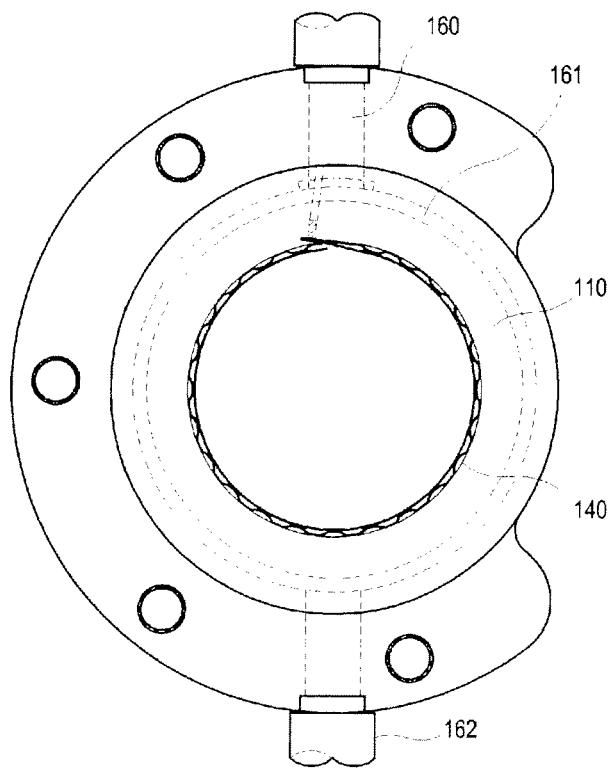
FIG. 5 is a front view showing a housing, a cooler and a journal bearing of the oil-free turbocharger assembly according to the present invention.

FIG. 5 is a front view showing a housing, a cooler and a journal bearing of the oil-free turbocharger assembly according to another embodiment of the present invention.

As shown in FIG. 5, an airfoil journal bearing (140) is located on the inner surface of the housing (110) and a cooler (160) is located around the outer surface of the housing. A cooling chamber (161) contacts the outer surface of the housing while refrigerant passes therethrough. Heat generated between the airfoil journal bearing (140) and the rotating shaft (120) may pass through the housing and be cooled by refrigerant passing through cooling chamber (161). In some embodiments this cooling may be accomplished through convection. This high cooling efficiency can be achieved since the heat transfer rate of this type of cooling is higher than that of air-cooled processes. At high temperatures and high speed driving conditions, sudden thermal deformation can occur on surfaces of the journal portion of the rotating shaft. The occurrence of fractures may also be caused by this thermal deformation. Thus, durability of the turbocharger can be improved with improved cooling efficiency.

The heated refrigerant from the cooling chamber in some embodiments may be cooled again in an external intercooler (not shown) which is connected to the cooler. In some embodiments, heated refrigerants are discharged through a refrigerant outlet (162) and then cooled again in the external intercooler. The cooled refrigerant may flow back into the cooler for recirculation. In some embodiments, cooling engine-oil substances, cooling water substances, etc. may be used as the refrigerant.

In FIG. 5, the airfoil journal bearing (140) is illustrated including bump foils and top foils. However, other types of airfoil journal bearings may be implemented according to desired outcomes and design considerations. For example in some embodiments of the invention, the airfoil journal bearing may include characteristics that will for the generation of enough dynamic pressure be capable of fully supporting the rotating shaft during rotation.

Figure 6:
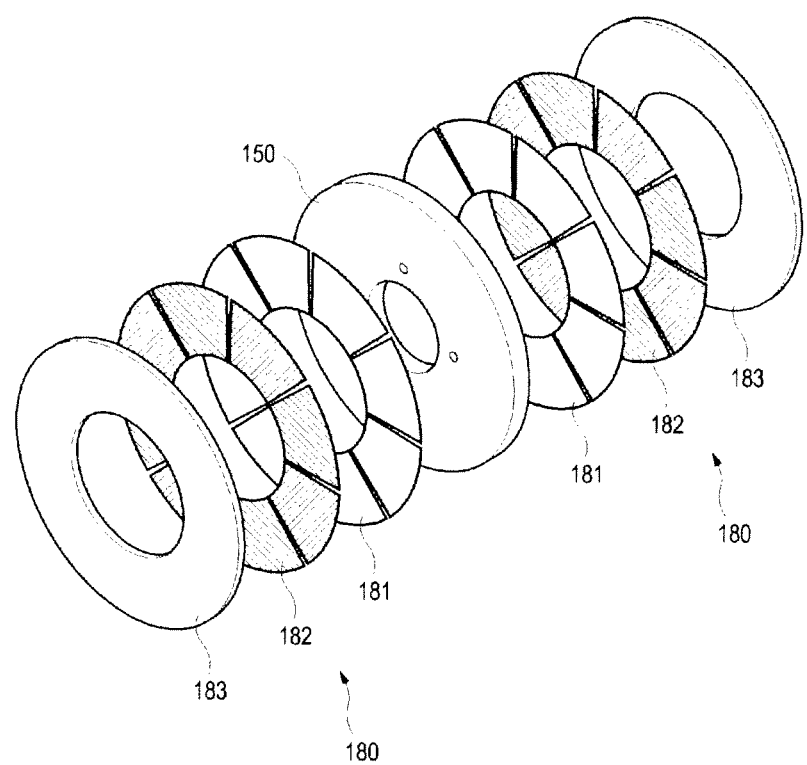
FIG. 6 is an exploded view showing a thrust pad and thrust bearing of the oil-free turbocharger assembly according to the present invention.

FIG. 6 is an exploded view showing a thrust pad and thrust bearing of the oil-free turbocharger assembly according to another embodiment of the present invention.

As shown in FIG. 6, the thrust bearing (150) has airfoil thrust bearings (180) at the front end and the rear end. The airfoil thrust bearing (180) includes a top foil (181) which generates an air film when the thrust pad (150) rotates, a bump foil (182) for dampening the generated dynamic pressure, and a coupling portion (183) which couples the top foil and the bump foil to the housing. The construction of the airfoil thrust bearing is also exemplary and its construction is not limited thereto.

In some embodiments, the top foil (181) and the bump foil (182) are cut in a radial direction several times. This results in the creation of an air boundary layer that is thinner during the rotation of the thrust pad at high speeds so that the dynamic pressure of the air can be formed easily.

Figure 7:
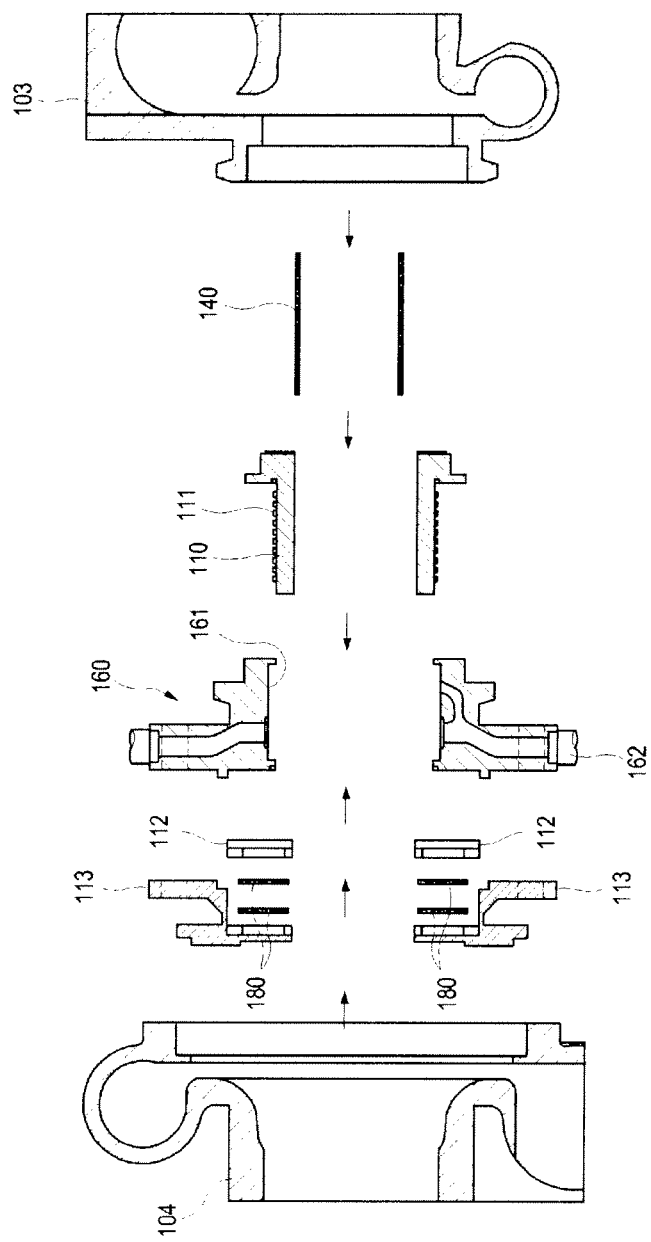
FIG. 7 is an exploded view showing cross sections of parts of the oil-free turbocharger assembly according to the present invention without the rotating parts.

FIG. 7 is an exploded view showing cross sections of parts of the oil-free turbocharger assembly according an embodiment of the present invention without the rotating parts.

As shown in FIG. 7, in addition to the housing (110) configured to receive the airfoil journal bearing (140) and the cooler (160), the turbocharger assembly according to this embodiment further includes a first thrust housing (112) and a second thrust housing (113) configured to easily receive the airfoil thrust bearing (180) and the thrust pad (150). One advantage in some embodiments may be easier assembly.

While the present invention has been described and illustrated with respect to alternate embodiments of the invention, it will be apparent to those skilled in the art that variations and modifications are possible without deviating from the broad principles and teachings of the embodiments presented, which should not be limited solely by the scope of the claims appended hereto.

The invention claimed is:
1. An oil-free turbocharger assembly comprising:
a housing having an inner surface;
a rotational body assembly including a rotating shaft positioned inside the housing, an impeller being coupled to one end of the rotating shaft, a turbine coupled to the other end of the rotating shaft, a journal portion coupled to a periphery of the rotating shaft, and a thrust pad coupled to the journal portion, wherein:

the thrust pad defines coupling holes, and the journal portion has coupling projections extending axially from an impeller side end portion of the journal portion to engage the coupling holes, a journal bearing located on the inner surface of the housing, the journal bearing configured to support the journal portion during rotational driving thereof; and a thrust bearing configured to axially support the thrust pad, wherein:

the rotating shaft comprises a fastening portion having a diameter larger than other portions of the rotating shaft, the journal portion has a cylindrical fastening recess in which the fastening portion is inserted and coupled and a cylindrical portion located axially opposite the fastening recess and having a cylindrical recess, wherein an inner wall of the journal portion that radially circumscribes the cylindrical fastening recess also radially circumscribes the coupled fastening portion, the fastening recess has a diameter corresponding to the diameter of the fastening portion such that the fastening portion is fitted to the fastening recess, the cylindrical portion is located in spaced-relation from the rotating shaft that is inserted in the cylindrical recess with a constant distance therebetween such that a space is formed between the rotating shaft and the cylindrical portion and such that a mass of the rotating assembly is reduced, the thrust pad is a circular disk coaxially disposed with respect to the rotating shaft, and the rotating shaft, the journal portion, and the thrust pad are manufactured individually and assembled into an integrated body.

2. The turbocharger assembly of claim 1, wherein the rotating shaft, the journal portion, and the thrust pad of the rotational body assembly are each treated with a heat-proof process prior to assembly.

3. The turbocharger assembly of claim 2, wherein the rotating shaft, the journal portion, and the thrust pad are treated with a solid-lubricant coating process, an abrasion process, and a polishing process respectively.

4. The turbocharger assembly of claim 3, wherein the turbocharger assembly further comprises a fastening member having a fastening projection located in a central coupling hole of the thrust pad toward the turbine.

5. The turbocharger assembly of any one of claims 1 to 4, wherein the journal bearing is an airfoil bearing configured to form dynamic pressure so as to support the rotational body assembly during rotation of the journal portion of the rotating shaft.

6. The turbocharger assembly of any one of claims 1 to 4, wherein the thrust bearing is an airfoil bearing configured to form dynamic pressure so as to axially support the rotational body assembly during rotation of the thrust pad.

7. The turbocharger assembly of claim 6, wherein the thrust bearing is an airfoil bearing having a top foil and a bump foil having cuts in a radial direction at regular intervals.

8. The turbocharger assembly of claim 1, further comprising a cooler configured to cool the outer surface of the housing corresponding to the journal portion.

9. The turbocharger assembly of claim 8, further comprising a plurality of cooling fins circumferentially disposed around the housing.

10. The turbocharger assembly of claim 8 or 9, wherein the cooler is connected to an intercooler and the refrigerant circulates throughout the housing, the refrigerant being circulated within the intercooler so as to be reintroduced into the cooler.

11. The turbocharger assembly of claim 10, wherein the refrigerant is a cooling engine-oil substance.

12. The turbocharger assembly of claim 10, wherein the refrigerant is a cooling water substance.

13. An oil-free turbocharger assembly comprising:

a housing having an inner surface;

a rotational body assembly including:

a rotating shaft positioned inside the housing;

an impeller being coupled to one end of the rotating shaft;

a turbine coupled to the other end of the rotating shaft;

a journal portion coupled to a periphery of the rotating shaft, wherein a first plurality of coupling projections extend axially from an impeller side end portion of the journal portion, and the journal portion has a cylindrical portion located in spaced-relation from the rotating shaft with a constant distance therebetween;

a thrust pad coupled to the journal portion, wherein the thrust pad is a circular disk coaxially disposed with respect to the rotating shaft, and includes coupling holes; and a coupling member coupled to the thrust pad, wherein a second plurality of coupling projections extend axially from a turbine side of the coupling member;

wherein the first plurality of coupling projections and second plurality of coupling projections engage the coupling holes;

a journal bearing located on the inner surface of the housing, the journal bearing configured to support the journal portion during rotational driving thereof; and a thrust bearing configured to axially support the thrust pad.

* * * * *